United States Patent
Zimmer

(10) Patent No.: US 10,687,540 B2
(45) Date of Patent: Jun. 23, 2020

(54) SYSTEM AND METHOD FOR PRODUCTION OF LOW THERMOPHILE AND LOW SPORE MILK POWDER

(71) Applicant: Caloris Engineering, LLC, Easton, MD (US)

(72) Inventor: Artur G. Zimmer, Oxford, MD (US)

(73) Assignee: Caloris Engineering, LLC, Easton, MD (US)

( * ) Notice: Subject to any disclaimer, the term of this patent is extended or adjusted under 35 U.S.C. 154(b) by 0 days.

(21) Appl. No.: 16/212,778

(22) Filed: Dec. 7, 2018

(65) Prior Publication Data
US 2019/0104749 A1 Apr. 11, 2019

Related U.S. Application Data

(62) Division of application No. 14/923,814, filed on Oct. 27, 2015, now Pat. No. 10,182,580.
(Continued)

(51) Int. Cl.
*A23C 1/12* (2006.01)
*B01D 1/26* (2006.01)
(Continued)

(52) U.S. Cl.
CPC .......... *A23C 1/12* (2013.01); *A23C 1/04* (2013.01); *A23C 9/16* (2013.01); *B01D 1/26* (2013.01)

(58) Field of Classification Search
CPC .... A23C 1/04; A23C 1/12; A23C 9/16; B01D 1/26
See application file for complete search history.

(56) References Cited

U.S. PATENT DOCUMENTS 2,570,213 A 10/1951 Cross
3,537,860 A * 11/1970 Moore .............. A23C 1/12
426/471
(Continued)

FOREIGN PATENT DOCUMENTS

EP 0 333 288 A1 9/1989
GB 2 293 746 A 4/1996
(Continued)

OTHER PUBLICATIONS

Gea. (2010) Milk Powder Technology: Evaporation and Spray Drying. Accessed Aug. 8, 2019 at https://docplayer.net/46479255-Milk-powder-technology-evaporation-and-spray-drying.html (Year: 2010).*
(Continued)

*Primary Examiner* — Youngsul Jeong
*Assistant Examiner* — Gabriel E Gitman
(74) *Attorney, Agent, or Firm* — Finnegan, Henderson, Farabow, Garrett & Dunner LLP

(57) ABSTRACT

A system and method is provided for processing milk for spray drying. The system may have a pre-evaporator configured to receive and concentrate the milk stream producing an intermediate concentration milk. The system may also have a first buffer tank configured to receive the intermediate concentration milk and store the intermediate concentrate milk at a reduced temperature. The system may further have a first finisher evaporator configured to draw the intermediate concentration milk from the first buffer tank and concentrate the intermediate concentration milk producing a final concentration milk. The final concentration milk may be suitable for spray drying.

20 Claims, 7 Drawing Sheets

Related U.S. Application Data

(60) Provisional application No. 62/069,017, filed on Oct. 27, 2014.

(51) Int. Cl.
*A23C 1/04* (2006.01)
*A23C 9/16* (2006.01)

(56) References Cited

U.S. PATENT DOCUMENTS

| | | | | |
|---|---|---|---|---|
| 4,448,795 A | * | 5/1984 | Termote | A23C 1/12 159/17.3 |
| 4,542,034 A | | 9/1985 | Aule et al. | |
| 5,580,592 A | | 12/1996 | Nassauer et al. | |
| 6,071,356 A | | 6/2000 | Olsen | |
| 6,391,361 B1 | * | 5/2002 | Peters | A23C 1/04 159/45 |
| 2003/0113425 A1 | | 6/2003 | Bodenstab | |
| 2004/0043123 A1 | | 3/2004 | Triantafyllou Oste et al. | |
| 2007/0286937 A1 | * | 12/2007 | Baechler | A23C 9/16 426/588 |

FOREIGN PATENT DOCUMENTS

| | | | | |
|---|---|---|---|---|
| GB | 2293746 A | * | 10/1996 | A23C 9/00 |
| NZ | WO2012038913 A1 | * | 3/2012 | A23C 9/16 |
| WO | WO 2010/045686 A1 | | 4/2010 | |
| WO | WO 2010/112673 A1 | | 10/2010 | |

OTHER PUBLICATIONS

Bansal, Bipan et al., "A Critical Review of Milk Fouling in Heat Exchangers," *Comprehensive Reviews in Food Science and Food Safety*, © 2006 Institute of Food Technologists, vol. 5, 2006, pp. 27-33.

Bucher Unipektin AG (2014), Evaporator for Dairy Applications, Accessed Dec. 12, 2017 at http://www.bucherunipektin.com/sites/default/files/download_center/FL-PRO-Dairy-Evaporator_EN, 1 page.

Burgess, S.A., et al., "The Formation of Spores in Biofilms of *Anoxybacillus flavithermus*," *Journal of Applied Microbiology 107* (2009), © 2009 The Authors, © 2009 The Society for Applied Microbiology, pp. 1012-1018.

Institute of Medicine (US) and National Research Council (US) Committee on the Review of the Use of Scientific Criteria and Performance Standards for Safe Food (2003), Scientific Criteria to Ensure Safe Food, Accessed Dec. 7, 2017 at https://www.ncbi.nlm.nih.gov/books/NBK221563, 1 page.

PCT Notification of Transmittal of the International Search Report and the Written Opinion of the International Searching Authority issued in International Application No. PCT/US2015/057476 dated Jan. 14, 2016, 9 pages.

Scott, Sara A. et al., "The Formation of Thermophilic Spores During the Manufacture of Whole Milk Powder," *International Journal of Dairy Technology*, vol. 60, No. 2, May 2007, © 2007 Society of Dairy Technology, pp. 109-117.

* cited by examiner

| SYSTEM COMPONENT | 0 to 10 | 10 to 12 | 12 to 14 | 14 to 22 | 22 to 24 | 24 to 26 | 26 to 34 | 34 to 36 | 36 to 38 | 38 to 46 | 46 to 48 |
|---|---|---|---|---|---|---|---|---|---|---|---|
| Heat Treatment System | ON | CIP | ON | ON | CIP | ON | ON | CIP | ON | ON | CIP |
| Pre-Evaporator System | ON | ON | ON | ON | OFF | ON | ON | CIP | ON | ON | CIP |
| First Buffer Tank | ON | OFF | CIP | OFF | OFF | ON | ON | ON | CIP | OFF | OFF |
| Second Buffer Tank | OFF | OFF | ON | ON | ON | CIP | OFF | OFF | ON | ON | ON |
| First Finisher Evaporator | ON | ON | CIP | OFF | OFF | ON | ON | OFF | CIP | OFF | OFF |
| Second Finisher Evaporator | OFF | OFF | ON | ON | ON | CIP | OFF | OFF | ON | ON | ON |
| First Dryer Feed System | ON | ON | OFF | ON | OFF | ON | ON | ON | OFF | ON | ON |
| Second Dryer Feed System | OFF | OFF | ON | OFF | ON | OFF | ON | ON | ON | OFF | ON |
| Spray Dryer | ON | ON | ON | ON | ON | ON | ON | ON | ON | ON | ON |
| | DAY 1 | | | | | DAY 2 | | | | | |

*FIG. 5*

SYSTEM AND METHOD FOR PRODUCTION OF LOW THERMOPHILE AND LOW SPORE MILK POWDER

RELATED APPLICATIONS

This application is a divisional of U.S. application Ser. No. 14/923,814, filed Oct. 27, 2015, which claims the benefit of U.S. Provisional Application No. 62/069,017, filed Oct. 27, 2014, which are both incorporated by reference in their entirety.

TECHNICAL FIELD

The present disclosure is directed towards a system and method for producing low thermophile and low spore milk products, and more particularly, heat treated milk powders.

BACKGROUND

For decades the dairy powder industry has been faced with the challenge of producing low thermophile and low spore dairy powder products. The presence of some level of thermophiles in dairy powder is inevitable because of their presence in the incoming raw milk. However, due to the exponential growth behavior of the thermophiles this minimum level can quickly grow to unacceptable levels over the course of a production cycle because the processing equipment provides an ideal growth environment. Concentration of the thermophiles and spore counts as the milk product solids are concentrated by evaporation and spray drying further multiplies the thermophile and spore counts by a factor of 7.5 or more. Consequently, there is a significant need for a system and method capable of consistently producing low thermophile and low spore dairy powder throughout a production cycle without having to repeatedly shut down the entire system for cleaning.

Thermophiles in milk powders are undesired because they produce heat resistant spore which are difficult to destroy, produce constituents which may detract product functionality, and spores and vegetative bacteria may cause spoilage in application. For these reasons and more milk powder customers do not want high thermophile and spore counts in their milk powders.

Biofilm is a primary cause of high thermophile counts in dairy powders. Biofilm is formed in processing equipment when a microbial bacteria cell attaches to the interior surface on which it remains in contact with the product and then the cell begins to grow and divides forming more bacteria cells. The number of bacteria cells increases rapidly and the bacteria cells begin to form micro colonies. This growth stage is referred to as the maturation period. Within about 9-12 hours the micro colonies begin to disperse cells, which can be carried further downstream in the process where they become attached and trigger the growth of additional micro colonies. In the first 9-12 hours, cell detachment from the biofilm is not a major issue. However, as shown in FIG. 1A, once detachment from the biofilm starts, the thermophile/spore count in the milk that is in contact with the biofilm increases rapidly. The thermophile/spore count is not the only thing that increases rapidly, the fouling rate of the processing equipment also increases. FIG. 1B shows magnitudinal development of the fouling rate and the spore count in an evaporator over 36 hours of continuous operation. As shown in FIG. 1A the spore count begins growing rapidly beyond approximately 9 to 12 hours along with the fouling rate. As a result, cleaning of the evaporator becomes increasingly more difficult the longer the operating run, therefore requiring more chemicals and longer cleaning cycles.

High temperature short time (HTST) pasteurization of milk will kill a portion of the living thermophilic bacteria that contaminates the milk leaving the heat exchangers of the preheating system, and higher temperature heat treatment steps will kill more of the bacteria and reduce the living thermophile population in the milk. However, a more significant long-term concern remains the "dormant" thermophile spores that are also released into the milk by the biofilm. The "dormant" thermophile spores are not killed by pasteurization and other heat treatment steps and these "dormant" thermophile spores will grow in the finished milk powder once sufficient moisture is re-introduced, even months after spray drying. An additional concern is that the concentration of the milk product in the evaporator simultaneously concentrates the population of these spores, which only compounds the problem of final spore contamination levels in the finished milk powder.

In response to this problem the dairy industry has used a variety of different techniques to try and limit the spore contamination in the finished milk powder. One of the traditional techniques includes, for example, installing a dual feed preheating system for the evaporator system and switching the feed flow to the second "clean" feed preheat system after approximately 10 hours of operation when the biofilm formed in the first preheat system has reached maturity. The first preheat system is then "isolated" for the remainder of the 20-hour evaporator processing day and may be independently cleaned in place (CIP) or with both feed preheat systems being CIP cleaned with the evaporator at the end of the 20 hour day to remove the matured biofilms and any other product fouling or residues.

Although this approach has been proven to reduce the thermophile and spore contamination of milk powders produced when running the evaporator system continuously for a 20-hour run, the 20-hours of continuous low spore operation remains a challenge that requires extraordinary discipline for everyday repeatability. Furthermore, switching the dual feed preheating system can cause solid concentration upsets in the evaporator and cause the HTST system to divert, which can lead to undesired disruption of the spray dryer operation. Also, it does not address the problem of thermophile biofilms which form and continue to grow in the downstream evaporator equipment, which adds to the contamination of the final milk powder with both living thermophilic bacteria and spores. This downstream biofilm issue can be partially mitigated by running the front end of the evaporator at elevated temperatures at which biofilm growth rates are reduced, but this does not entirely address the problem.

In addition, this approach of operating the evaporator system for 20 hours and then CIP cleaning for 4 to 5 hours requires the evaporator system and spray dryer to be offline up to 20% of every day, during which time the spray dryer is not producing milk powder. Some facilities may have two or more evaporator systems feeding one or more spray dryers to achieve nearly perpetual spray dryer operation, but this requires significant capital investment in equipment, and a significant period of the time a portion of the equipment will be sitting idle. Capital investment in equipment that sits idle for extended periods of time is an economically infeasible option for many producers.

Furthermore, frequent starting and stopping of the spray dryer is undesired because startup and shutdown can be complex and decreases efficiency. Instead, the most desired and efficient manner of operation for a spray dryer is continuous operation for periods exceeding, for example, several days or even weeks. Continuous operation of the spray dryer has become increasingly more coveted in recent years as the demand for milk powders has surged worldwide, particularly in Asia. As a result of the surge in demand, milk powder producers have been trying to boost production capacity any way they can.

Some producers have attempted to eliminate the 4-5 hour shutdown of the spray dryer during the evaporator cleaning by storing a volume of milk concentrate in a buffer tank between the evaporator and the spray dryer. However, milk concentrate at 50% TS (i.e., typical spray dryer feed concentration) cannot be held in a buffer tank for very long without age thickening of the concentrate if the milk is stored hot, or lactose crystallization and gelling if the milk concentrate is stored cold. This problem becomes exacerbated when the milk product has been heat treated to a medium or high heat specification. As a result, this has not been found to be a practical solution.

Another technique tested for addressing the thermophile and spore growth problem was frequent shutdowns for CIP cleaning of the entire evaporator system, but this still creates the issue of frequent starting and stopping of equipment which is particularly impractical for the spray dryer and which causes a significant reduction in net production time for the entire processing line.

In another effort to maximize production, some milk powder producers partially concede to the thermophile and spore growth by choosing to continue a production run despite the likelihood of high thermophile and spore counts. In these situations the producer may separate the milk powder produced earlier in the production run from the milk powder produced later and then separately package and offer it for sale as different quality.

In consideration of the aforementioned circumstances, and the shortcomings of all the prior attempted solutions by those in the industry, the present disclosure provides a new evaporator and heat treatment system and method for producing low thermophile and low spore milk powders capable of continuous spray dryer operation. The method for producing low thermophile and low spore milk powders of the present disclosure also applies successfully to more traditional 20 hour spray dryer milk powder production cycles where only one (1) finisher evaporator and one (1) spray dryer feed system are available to supply 50% TS concentrate feed to the spray dryer.

SUMMARY

One aspect of the present disclosure is directed to a system for processing a milk stream. The system may include a pre-evaporator configured to receive and concentrate the milk stream producing an intermediate concentration milk. The system may also include a first buffer tank configured to receive the intermediate concentration milk and store the intermediate concentrate milk at a reduced temperature. The system may further include a first finisher evaporator configured to draw the intermediate concentration milk from the first buffer tank and concentrate the intermediate concentration milk producing a final concentration milk. The final concentration milk may be suitable for spray drying.

Another aspect of the present disclosure is directed to a method of processing a milk stream. The method may include concentrating the milk stream using a pre-evaporator thereby producing an intermediate concentration milk and directing the intermediate concentration milk to a buffer tank. The method may also include cooling and accumulating a holdup volume of intermediate concentration milk in the buffer tank. The method may further include drawing and reheating the intermediate concentration milk from the buffer tank and concentrating the reheated intermediate concentration milk from the buffer tank using a finisher evaporator thereby producing a final concentration milk.

Another aspect of the present disclosure is directed to a system for processing a milk stream. The system may include a finisher evaporator. The finisher evaporator may be configured to draw an intermediate concentration milk from a buffer tank. The finisher evaporator may also be configured to concentrate the intermediate concentration milk to produce a final concentration milk and supply the final concentration milk to a dryer feed system and a spray dryer. The intermediate concentration milk may be supplied to the buffer tank by a pre-evaporator configured to concentrate the milk stream, thereby producing the intermediate concentration milk. The intermediate concentration milk may be accumulated and stored in the buffer tank at a reduced temperature between about 35° F. to about 50° F. The pre-evaporator, the buffer tank, and the finisher evaporator may be sized so that the buffer tank is capable of accumulating a holdup volume of intermediate concentration milk sufficient to enable the pre-evaporator to be temporarily taken offline to be CIP cleaned during which time the finisher evaporator continues producing final concentration milk by drawing down the holdup volume.

Additional objects and advantages of the present disclosure will be set forth in part in the description which follows, and in part will be obvious from the description, or may be learned by practice of the present disclosure. The objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure as claimed.

The accompanying drawings, which are incorporated in and constitute a part of this specification, illustrate several embodiments of the present disclosure and together with the description, serve to explain the principles of the present disclosure.

BRIEF DESCRIPTION OF THE DRAWINGS

FIG. 5 is a chart illustrating a sequence of operation of a system and method, according to an exemplary embodiment.

Reference will now be made in detail to the present exemplary embodiments of the present disclosure, examples of which are illustrated in the accompanying drawings.

Wherever possible, the same reference numbers will be used throughout the drawings to refer to the same or like parts.

DETAILED DESCRIPTION

The present disclosure is described herein with reference to illustrative embodiments for a particular application, such as, for example, production of low thermophile and low spore heat treated milk products. It is understood that the embodiments described herein are not limited thereto. For example, the embodiments described herein may also be able to produce heat treated milk products having a low mesophile count in addition to having a low thermophile and low spore count. Those having ordinary skill in the art and access to the teachings provided herein will recognize additional modifications, applications, embodiments, and substitution of equivalents that all fall within the scope of the present disclosure. In some embodiments, the present disclosure may be utilized for other products concentrated by evaporation or evaporated and then spray dried to a powder, for example, soy milk, almond milk, coconut milk, or any application of evaporation and spray drying where spore and bacteria growth may be a concern. Accordingly, the present disclosure is not limited by the foregoing or following descriptions.

The term "about" or "approximately" as used herein means within an acceptable error range for the particular value as determined by one of ordinary skill in the art, which will depend in part on how the value is measured or determined, e.g., the limitations of the measurements system. For example, "about" can mean within one or more than one standard deviation per the practice in the art. Alternatively, "about" can mean a range of up to 20%, such as up to 10%, up to 5%, and up to 1% of a given value.

A system and method of producing low thermophile and low spore heat treated milk powders capable of continuous spray dryer output, according to an exemplary embodiment, is described herein.

Figure 1A:
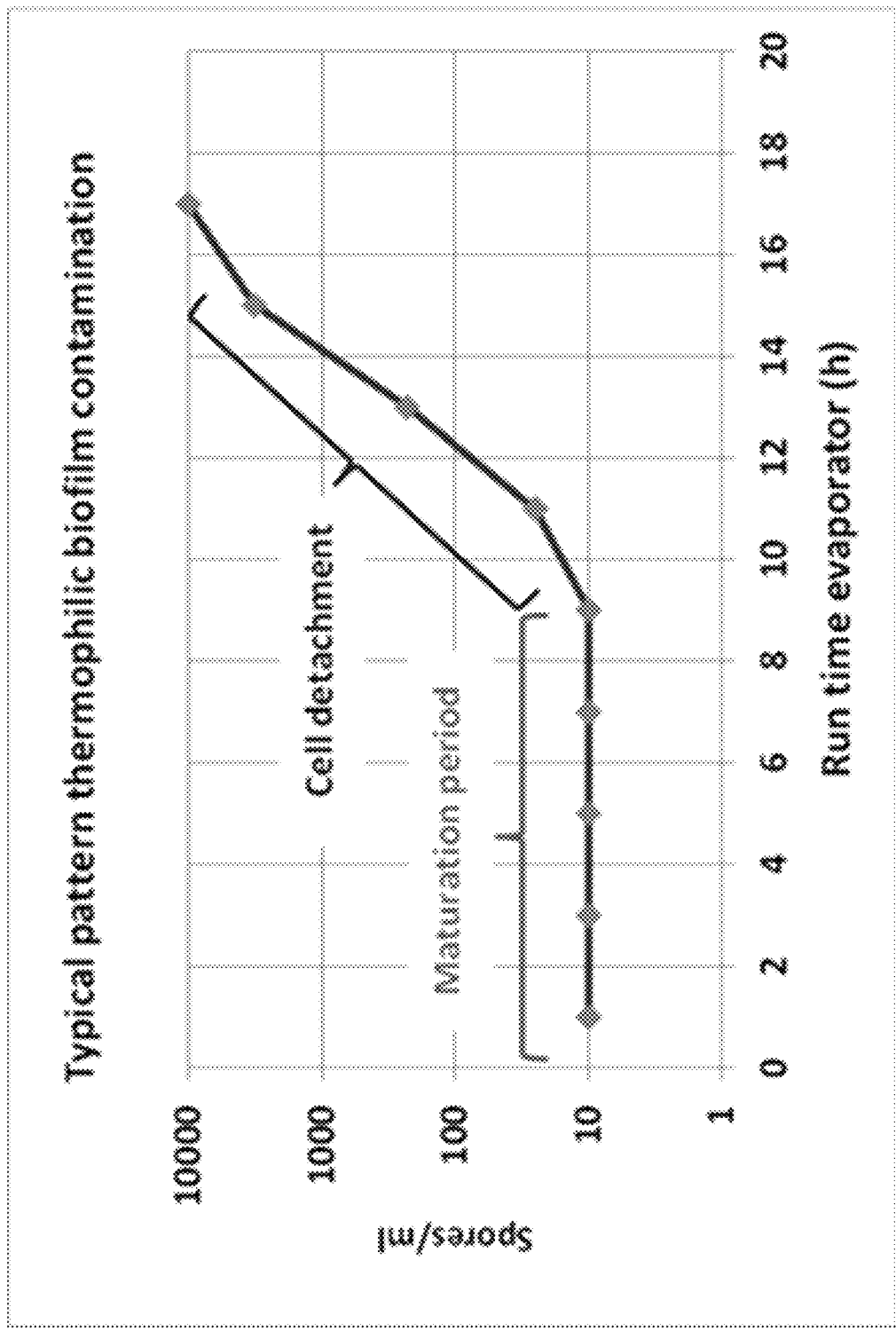
FIG. 1A is a plot illustrating the typical thermophilic biofilm contamination for an evaporator.
Figure 1B:
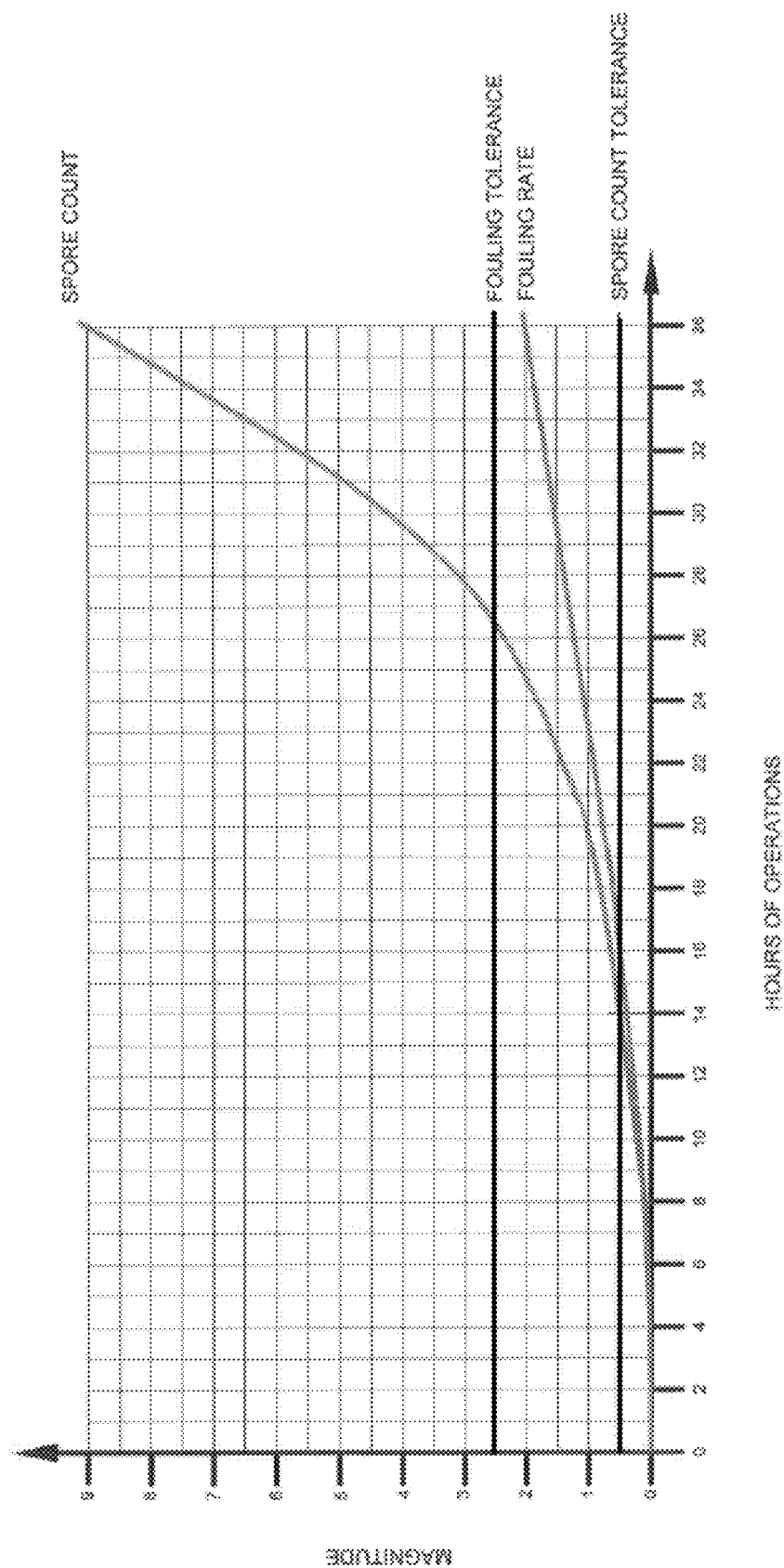
FIG. 1B is a plot illustrating the typical magnitudinal development of fouling and spore count in an evaporator over hours of operation.
Figure 2A:
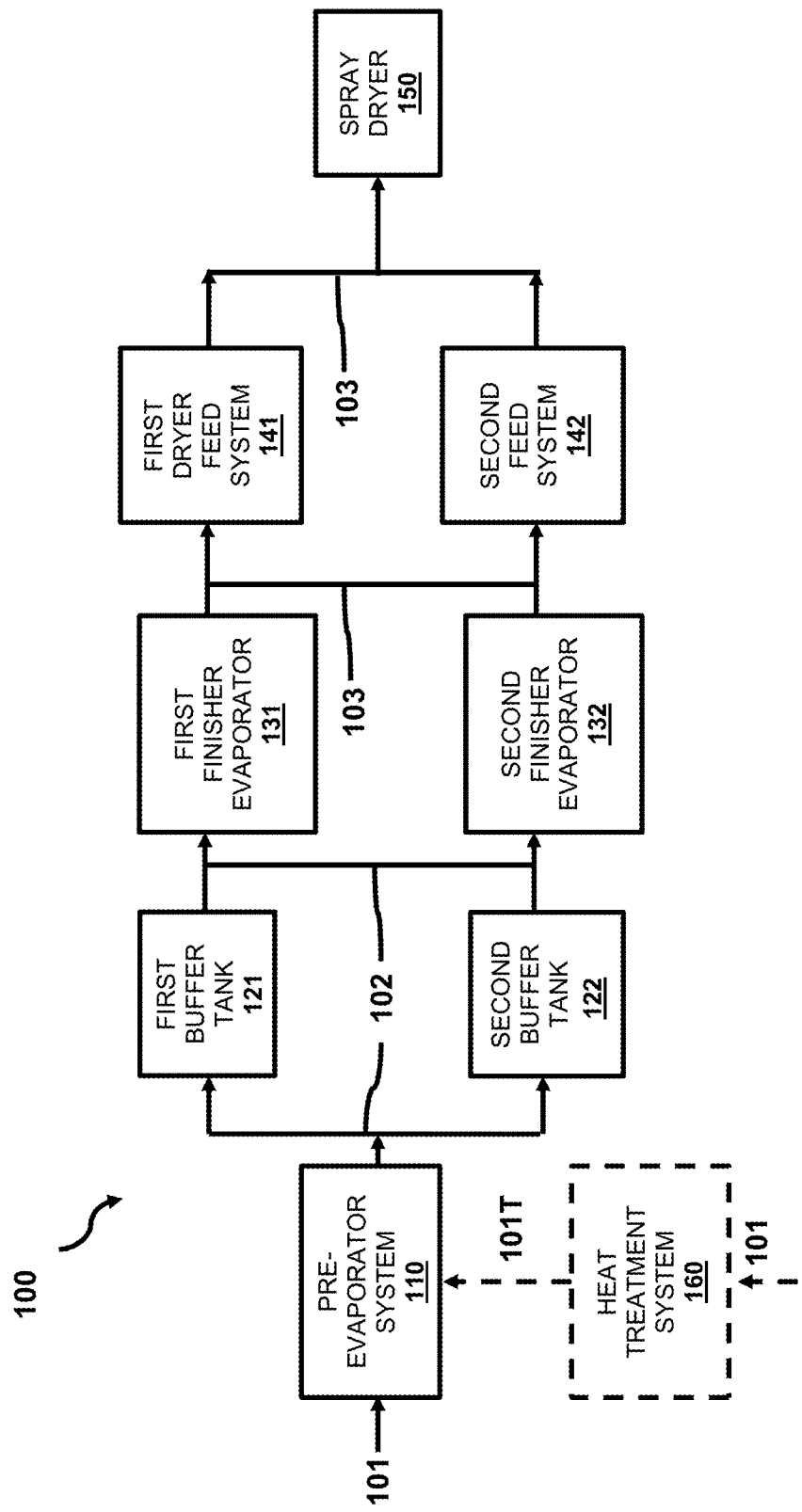
FIG. 2A is a flow diagram of a powder production system, according to an exemplary embodiment.

FIG. 2A shows a flow diagram of a system 100 for processing milk for spray drying, according to an exemplary embodiment. System 100 can comprise, among other things, a pre-evaporator system 110, a first buffer tank 121, a second buffer tank 122, a first finisher evaporator 131, a second finisher evaporator 132, a first dryer feed system 141, a second dryer feed system 142, and a spray dryer 150.

As shown in FIG. 2A, system 100 can further comprise a heat treatment system 160 configured to heat treat a milk stream 101 and discharge a heat treated milk stream 101T. Heat treatment system 160 can be configured for indirect contact heating, direct contact heating by direct infusion of steam or saturated water vapors, or a combination of indirect contact and direct steam or vapor infusion heating of milk stream 101 up to a temperature of 250° F. Heat treatment system 160 can be configured to perform various heat treatment methods producing various grades of heat treated milk 101T, for example, medium heat, high heat, and high heat stable milk. In some embodiments, heat treatment system 160 may be configured to receive pasteurized or unpasteurized milk.

Pre-evaporator system 110 can be configured to receive milk stream 101 (e.g., whole milk or skim milk) or a heat treated milk stream 101T (e.g., heat treated whole milk or heat treated skim milk). Milk stream 101 and heat treated milk stream 101T can range in concentration and temperature. For example, the total solids (TS) concentration for a whole milk stream, including a standardized whole milk stream can range from between about 10% TS to about 15% TS, about 11% TS to about 14% TS, about 12% TS to about 14% TS, about 12% TS to about 13.5% TS, about 12.5% TS to about 13% TS, or about 12.5% to about 12.7% TS. The total solids (TS) concentration for a skim milk stream, including a standardized skim milk stream can range from between about 6% TS to about 12% TS, about 7% TS to about 11% TS, about 8% TS to about 10% TS, or be a concentration of about 9% TS. Typically milk concentrations are standardized in the US; however, non-standardized milk can have higher or lower concentrations.

The temperature of milk stream 101 (e.g., whole milk or skim milk) can vary, for example the temperature can range from between about 35° F. to about 45° F., about 36° F. to about 44° F., about 37° F. to about 43° F., about 38° F. to about 42° F., about 39° F. to about 41° F., or be a temperature of about 40° F. In yet another example, the temperature of heat treated milk stream 101T can range from about 165° F. to about 185° F. (e.g., U.S. legal pasteurization range). In yet another embodiment, milk may be supplied at about 120° F. to about 130° F., for example, skim milk from a cream separator where the milk is unpasteurized. In yet another embodiment, milk may be supplied at about 50° F. to about 60° F. from a cold cream separation process.

Pre-evaporator system 110 can be a mechanical vapor recompression (MVR) evaporator system comprising one or more falling film calandrias, one or more vapor separators, and one or more turbofan assemblies. In other embodiments, pre-evaporator system 110 can be an alternative evaporator system configuration (e.g., a direct steam or thermal vapor recompression (TVR) steam heated evaporator). In some embodiments, pre-evaporator system 110 may also include a pasteurizer in-line or integrated into the pre-evaporator system 110. In some embodiments, pre-evaporator system may also include additional ancillary equipment, for example, feed heat exchangers configured to adjust the temperature of the incoming feed stream depending on the type of milk stream 101 and/or the parameters of operations. It is noted that when referring to pre-evaporator system 110 herein, for some embodiments, such reference may also include reference to a pasteurizer and other ancillary equipment (e.g., feed heat exchangers) associated with the pre-evaporator system 110.

Pre-evaporator system 110 can be configured to receive milk stream 101 and/or heat treated milk stream 101T, remove (e.g., evaporate) at least a portion of the water (i.e., increasing the TS concentration), and discharge an intermediate concentration milk stream 102. Intermediate concentration milk stream 102 can range in concentration. For example, a whole milk intermediate concentration, including a standardized whole milk stream, milk stream 102 can range from about 30% TS to about 45% TS, about 32% TS to about 45% TS, about 34% TS to about 45% TS, about 36% TS to about 45% TS, about 36% TS to about 42% TS, about 36% TS to about 40% TS, about 30% TS to about 42% TS, about 32% TS to about 42% TS, about 34% TS to about 42% TS, about 36% TS to about 42% TS or be a concentration of about 37% TS. A skim milk intermediate concentration, including a standardized skim milk stream, milk stream 102, for example can range from about 30% TS to about 42% TS, about 31% TS to about 40% TS, about 32% TS to about 38% TS, about 33% TS to about 36% TS, or a concentration of about 33% TS or about 34% TS. The temperature of intermediate concentration milk stream 102 discharged from pre-evaporator system 110 can range, for example, from about 140° F. to about 160° F., about 145° F. to about 155° F., about 149° F. to about 151° F. or be a temperature of about 150° F.

As shown in FIG. 2A, system 100 can comprise first buffer tank 121 and second buffer tank 122. First buffer tank 121 and second buffer tank 122 can be of the same volume or different volumes. System 100 can be configured such that during normal operation, first buffer tank 121 or second buffer tank 122 is online. In other embodiments, system 100 can be configured such that both buffer tanks 121/122 are online at certain periods (e.g., during transitions, switch overs, startup, or shutdown). As utilized herein, first buffer tank 121 and second buffer tank 122 may be any suitable storage type container (e.g., tank, vessel, silo, or the like).

As shown in FIG. 2A, system 100 can be configured such that intermediate concentration milk stream 102 can be supplied to first buffer tank 121 and/or second buffer tank 122. The piping and valves between pre-evaporator system 110 and first buffer tank 121 and second buffer tank 122 can be configured to control the flow of intermediate concentration milk stream 102 and direct it to whichever buffer tank 121/122 or tanks that may be online. First buffer tank 121 and second buffer tank 122 can be configured to agitate intermediate concentration milk stream 102 within the tanks. System 100 can further comprise heat exchangers (not shown) configured to cool the temperature of intermediate concentration milk stream 102 received by first buffer tank 121 and second buffer tank 122. The temperature of intermediate concentration milk stream 102 can be cooled to, for example, a range of about 35° F. to about 50° F., about 40° F. to about 48° F., about 42° F. to about 46° F., or be a temperature of about 45° F. Cooling the intermediate concentration milk can limit or prevent microbiological activity.

As shown in FIG. 2A, first buffer tank 121 and second buffer tank 122 can be configured to supply intermediate concentration milk stream 102 to either first finisher evaporator 131 or second finisher evaporator 132. First finisher evaporator 131 and second finisher evaporator 132 can have the same evaporation capacity or have different evaporation capacities. Intermediate concentration milk stream 102 leaving first buffer tank 121 or second buffer tank 122 can be heated by passing it through a heat exchanger (not shown) which regeneratively transfers heat from intermediate concentration milk stream 102 discharged from pre-evaporator system 110 to intermediate concentration milk stream 102 discharged from first buffer tank 121 or second buffer tank 122. In other embodiments, additional heat exchangers (not shown) can be used to further heat intermediate concentration milk stream 102 before entering first finisher evaporator 131 and second finisher evaporator 132.

First finisher evaporator 131 and second finisher evaporator 132 can each comprise a MVR evaporator system. First finisher evaporator 131 can comprise a falling film calandria, a vapor separator, and a turbofan assembly. Second finisher evaporator 132 can also comprise a falling film calandria, a vapor separator, and a turbofan assembly. In other embodiments, first finisher evaporator 131 and second finisher evaporator 132 can be an alternative evaporator system configuration (e.g., a direct steam heated evaporator or TVR steam heated evaporator system).

First finisher evaporator 131 and second finisher evaporator 132 can each be configured to receive intermediate concentration milk stream 102 and remove (e.g., evaporate) a portion of the water (i.e., increasing the TS concentration), and discharge a final concentration milk stream 103. The final concentration of final concentration milk stream 103 for whole milk and skim milk, including standardized, can range in concentration from, for example, about 40% TS to about 65% TS, about 45% TS to about 55% TS, about 46% TS to about 54% TS, about 47% TS to about 53% TS, about 48% TS to about 52% TS, about 49% TS to about 51% TS, or be a concentration of about 50% TS. Final concentration milk stream 103 may be concentrated such that it is suitable for spray drying System 100 can be configured such that during normal operation, first finisher evaporator 131 or second finisher evaporator 132 is online. In some embodiments, system 100 can be configured such that, both first finisher evaporator 131 and second finisher evaporator 132 are online during certain periods (e.g., during transitions or switch overs). First finisher evaporator 131 and second finisher evaporator 132 can be substantially the same design and evaporation capacity.

As shown in FIG. 2A, first finisher evaporator 131 and second finisher evaporator 132 can each be configured to supply final concentration milk stream 103 to either first dryer feed system 141 or second dryer feed system 142. First dryer feed system 141 and second dryer feed system 142 can be configured to supply final concentration milk stream 103 to spray dryer 150.

System 100 can be configured such that during operation, first dryer feed system 141 or second dryer feed system 142 is always online. In some embodiments, system 100 can be configured such that, both first dryer feed system 141 and second dryer feed system 142 are online during certain periods (e.g., during transitions, switch overs, startup, or shutdown). Therefore, system 100 can be configured such that either first dryer feed system 141 or second dryer feed system 142 can be supplying final concentration milk 103 to spray dryer 150 continuously during operation.

As described above, after about 10 hours of operation without cleaning the thermophile and spore count in an evaporator, pasteurizer, or preheater (e.g., pre-evaporator system 110), can increase rapidly as mature biofilms begin releasing thermophiles and spores. Therefore, it is preferred to shut down pre-evaporator system 110 and heat treatment system 160, including any other ancillary equipment (e.g., pre-heaters and pasteurizer) that handles the milk stream, after 10 hours and perform a clean in place (CIP), which can remove most or all the biofilm from pre-evaporator system 110 and therefore restarts the formation and growth cycle of the biofilm during which time the release of thermophiles and spores from the biofilms is negligible, when production is restarted with a clean pre-evaporator system 110. However, as described above, continuous operation of spray dryer 150 is coveted. Therefore, system 100, as described herein according to an exemplary embodiment, can be configured to continue feeding final concentration milk 103 to spray dryer 150 while pre-evaporator system 110 is taken offline for a CIP cleaning. When heat treatment system 160 is feeding pre-evaporator system 110, heat treatment system 160 may also be taken offline for a CIP cleaning simultaneously with pre-evaporator system 110. Some of the features of system 100, which can enable the continuous spray dryer feed operation, are described below in detail.

According to an exemplary embodiment, pre-evaporator system 110 can be sized such that its production discharge capacity of intermediate concentration milk 102 is greater than the production feed capacity of either first finisher evaporator 131 or second finisher evaporator 132. Therefore, during operation when pre-evaporator system 110 is processing milk stream 101 or heat treated milk stream 101T and discharging intermediate concentration milk 102, the volume of intermediate concentration milk 102 in whichever buffer tank (i.e., first buffer tank 121 or second buffer tank 122) is online can be increased. This situation may arise because whichever finisher evaporator (i.e., first finisher evaporator 131 or second finisher evaporator 132) is online will be drawing less intermediate concentration milk 102 from the online buffer tank than is being fed from pre-evaporator system 110. Thus, during operation the surplus of intermediate concentration milk 102 supplied to the online buffer tank (i.e., first buffer tank 121 or second buffer tank 122) can be collected to create a holdup volume.

As discussed above, milk concentrate at about 45% to about 50% TS cannot be held in a buffer tank for very long without age thickening of the concentrate when held at a hot temperature or lactose crystallization when held at a cold temperature and this problem becomes exacerbated when the milk product has been heat treated to a medium or high heat specification. However, according to the present embodiment, as described herein, intermediate concentration milk 102 can be stored at a lower concentration range, at a reduced temperature (e.g., 40° F.), and in an agitated tank, which enables storage for hours or days without the risk of age thickening, lactose crystallization or re-initiation of microbiological activity. The lower concentration range may be for example, a range of about 30% TS to about 42% TS, about 32% TS to about 42% TS, about 34% TS to about 42% TS, about 36% TS to about 42% TS about 30% TS to about 40% TS, about 32% TS to about 40% TS, about 34% TS to about 40% TS, about 36% TS to about 40% TS, about 36% TS to about 39% TS, about 36% TS to about 38% TS, or be a concentration of about 37% TS.

According to an exemplary embodiment, the production discharge capacity of pre-evaporator system 110 can be, for example, about 120% of the production feed capacity of the online finisher evaporator (i.e., first finisher evaporator 131 or second finisher evaporator 132). Therefore, after about 5 hours the holdup volume in the online buffer tank can be substantially equal to 1 hour of production capacity of the online finisher evaporator or after about 10 hours the holdup volume in the online buffer tank can be substantially equal to 2 hours of production capacity of the online finisher evaporator. In other embodiments, the production discharge capacity of pre-evaporator system 110 compared to the production feed capacity of the online finisher evaporator can vary, for example, capacity can be about 105%, about 110%, about 115%, about 125%, about 135%, or more. Pre-evaporator system 110 may also be controlled such that the production discharge capacity of pre-evaporator system 110 may be equal to or less than the production feed capacity of the online finisher evaporator. Such control of the production capacity of each evaporator can enable precise control over the holdup volume.

According to an exemplary embodiment, after 10 hours of production, when the holdup volume in the online buffer tank is about equal to 2 hours of production capacity of the online finisher evaporator then pre-evaporator system 110 can be taken offline for CIP cleaning. Pre-evaporator system 110 can be configured such that a complete (e.g., product-to-product) CIP cleaning cycle takes 2 hours or less. System 100 can be configured to take offline heat treatment system 160 for CIP cleaning at the same times as pre-evaporator system 110. Although taken offline at the same time for cleaning, system 100 can be configured such that CIP for pre-evaporator system 110 can be separate from heat treatment system 160. By cleaning each system 100 components separately the time needed for CIP can be reduced. For example, pre-evaporator system 110 and heat treatment system 160 can each be configured such that CIP takes 2 hour or less to perform.

CIP cleaning cycles for the various components of system 100 can be generally similar, but the specific chemicals, concentrations, temperature steps, and duration of each step can vary based on the component. For example, a CIP can comprise a product flush, a water rinse, a caustic flush, an acid flush and additional water and caustic flushes.

While pre-evaporator system 110 and heat treatment system 160 may be offline for cleaning, whichever finisher evaporator 131/132 may be online can draw down the holdup volume in the online buffer tank. As described above, the holdup volume can be sufficient to enable the online finisher evaporator to continue processing for at least as long as is needed to CIP and restart pre-evaporator system 110 (e.g., 2 hours).

After completing the CIP of pre-evaporator system 110, pre-evaporator system 110 can be brought back online and be configured to start feeding the buffer tank that had previously been offline and the finisher evaporator that had previously been offline can also be brought online. Bringing the clean buffer tank and clean finisher evaporator online can then allow the other (i.e., dirty) buffer tank and finisher evaporator to be taken offline and cleaned. Similar to pre-evaporator system 110, the cleaning of the dirty buffer tank and dirty finisher evaporator can be configured to take 2 hours or less. The dirty buffer tank and dirty finisher may also be cleaned for longer than 2 hours while the other finisher evaporator is in operation, which may be beneficial or desired to remove heavy fouling. After the completion of CIP, the clean buffer tank and clean finisher evaporator can wait in standby until they are next brought online.

Figure 2B:
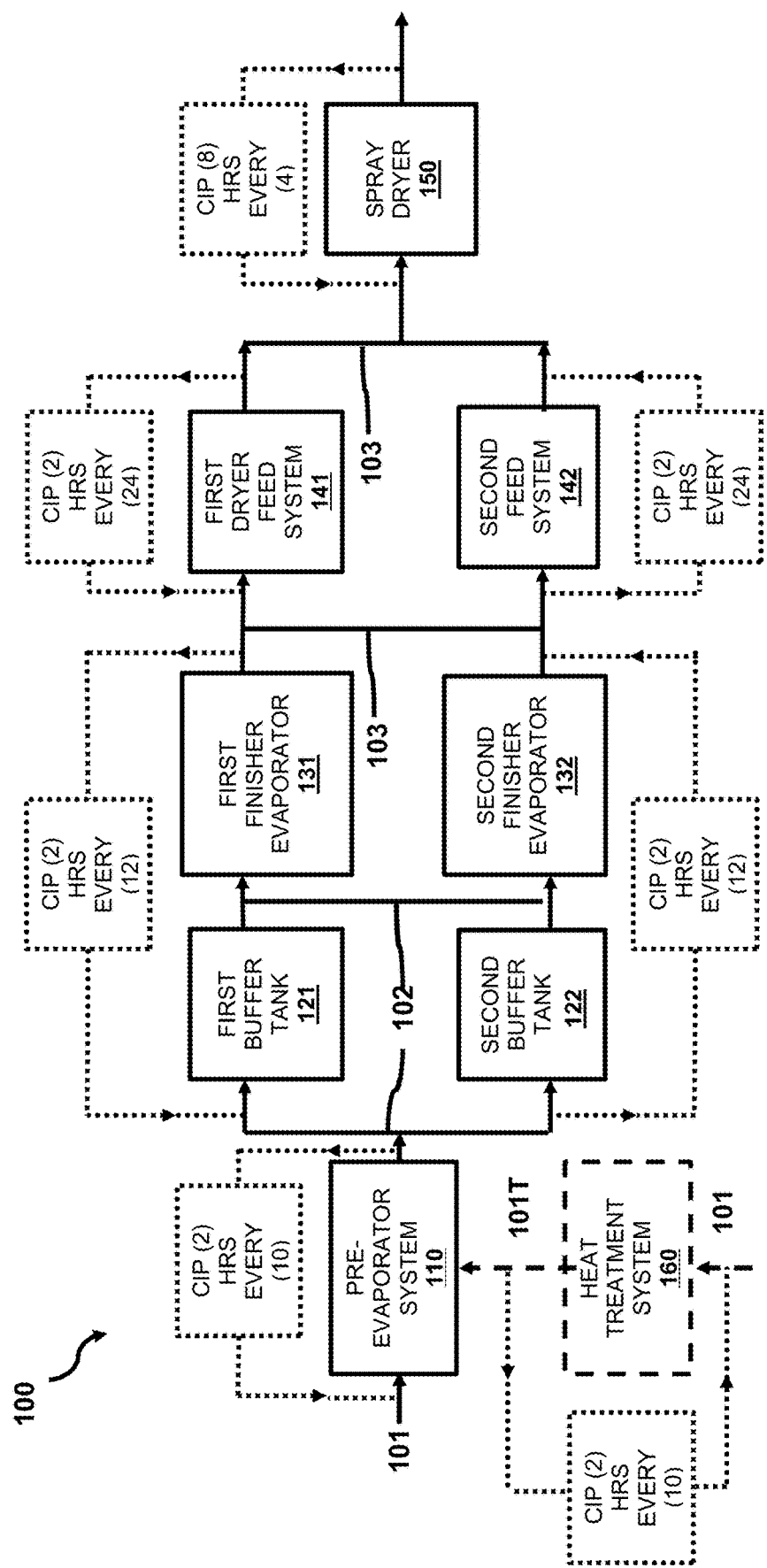
FIG. 2B is a flow diagram of the powder production system of FIG. 2A, including illustration of CIP cycles, according to an exemplary embodiment.

FIG. 2B shows a flow diagram of system 100 same as in FIG. 2A and additional CIP cycles parameters (e.g., duration and frequency) for the different components, according to an exemplary embodiment. It is contemplated that the duration and frequency are approximations and that actual time may vary. In addition, it is also contemplated that for other embodiments these CIP durations and frequencies may be adjusted based on variation in desired operation.

Therefore, system 100, according to an exemplary embodiment can be configured such that without shutting down spray dryer 150, pre-evaporator system 110 and heat treatment system 160 can be taken offline for CIP cleaning at least once every 10 hours, first buffer tank 121 and second buffer tank 122 can be taken offline for CIP cleaning at least once every 12 hours, and first finisher evaporator 131 and second finisher evaporator 132 can be taken offline for CIP cleaning at least once every 12 hours.

First dryer feed system 141 and second dryer feed system 142 can be configured to alternate being online, for example, every 6 hours, every 12 hours, or every 24 hours. Whichever dryer feed system is offline can be cleaned enabling cleaning of each dryer feed system at least once every 24 hours of operation. Cleaning of each dryer feed system 141/142 can be configured to take 2 hours or less. Due to the location of dryer feed systems 141/142 in system 100 and the environmental conditions, the biofilm growth in the dryer feed systems is likely to be much less than that demonstrated in the upstream and therefore the dryer feed systems can undergo a CIP just once every 24 hours. In other embodiments, the frequency of CIP cleaning for dryer feed systems 141/142 can be greater than 24, for example 30 hours, 36 hours, 42 hours, etc.

System 100 can be configured such that sprayer dryer 150 can receive final concentration milk 103 continuously for at least 24 hours. For example, spray dryer 150 can operate continuously for about 1 to about 2 days, about 2 to about 3 days, about 3 to about 4 days, about 4 to about 5 days, about 5 to about 6 days, about 6 to about 7 days, about 1 to about 2 weeks, about 2 to about 3 weeks, about 3 to about 4 weeks, about 1 to about 2 months, about 2 to about 3 months, or more before spray dryer 150 may need to be taken offline for CIP cleaning.

As discussed herein, the presence and growth of thermophile biofilms and spores within the milk streams (i.e., 101, 102, and 103) is a constant concern. As highlighted above, thermophile and spore populations begin increasing exponentially within about 10 to 12 hours of starting operation with a clean evaporator system. Thus, system 100 can be well suited for limiting the exponential growth of thermophile and spores because pre-evaporator system 110, heat treatment system 160, buffer tanks 121/122, and finisher evaporators 131/132 are cleaned (i.e., CIP) at least once every 12 hours. Therefore, thermophile biofilm can be removed (i.e, by CIP cleaning) from the feed inlet to the initial evaporator preheating system including an ancillary equipment (e.g., pre-heaters and pasteurizer) all the way downstream to the finisher evaporator at the time (i.e., 10 to 12 hours) when the biofilm is maturing, beginning to release contaminants into the milk, and grow exponentially.

According to an exemplary embodiment, system 100 can also be configured such that spray dryer 150 can be 15% to 20% smaller compared to a traditional milk powder production system that operates on a cycle of 20 hours online and 4 hours cleaning per day because spray dryer 150 can operate 24 hours per day. Alternatively, by operating 24 hours per day system 100 can produce about 20% more milk powder than an equivalent size spray dryer that operates on the traditional 20 hours online and 4 hours cleaning cycle.

Figure 3:
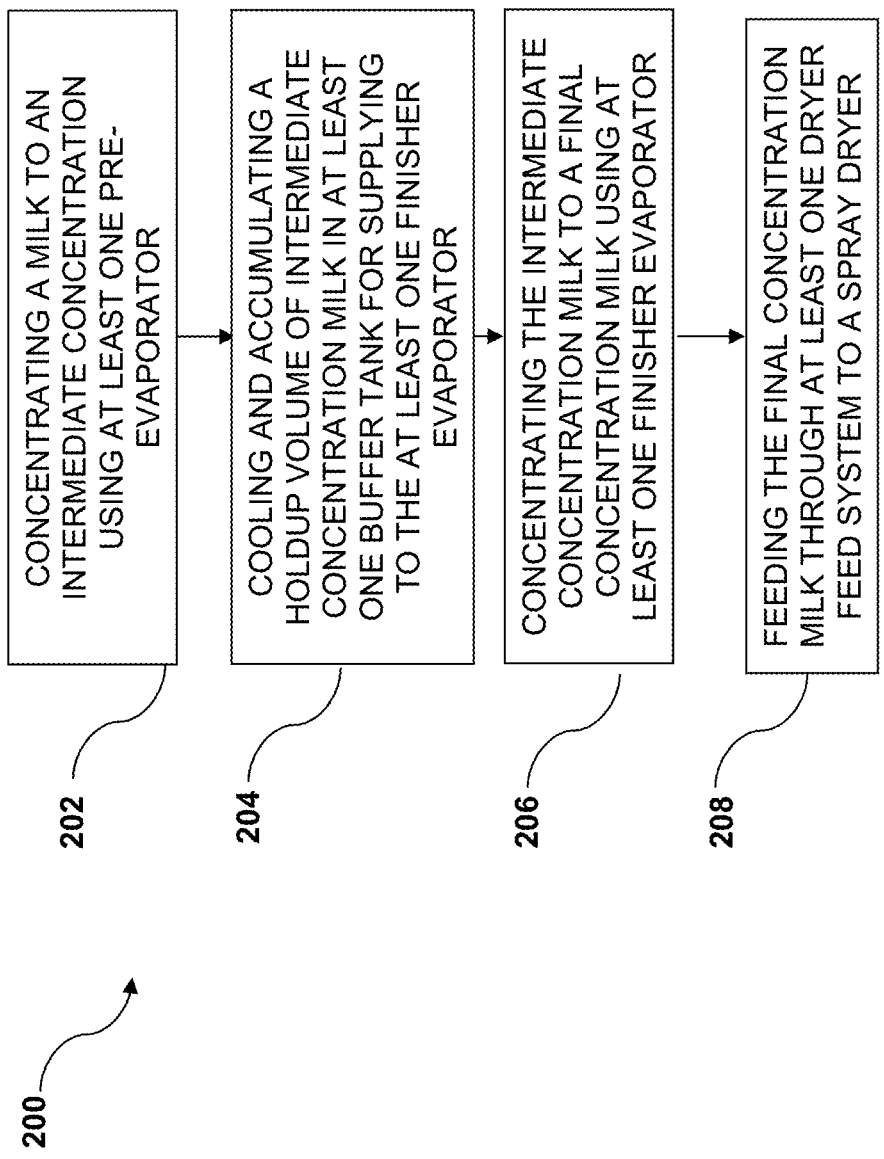
FIG. 3 is a flow chart of a method of operation, according to an exemplary embodiment.

System 100 as described herein can be used to perform a method 200 of processing a milk stream (e.g., 101 or 101T) for spray drying. According to an exemplary embodiment, method 200 can comprise steps 202, 204, 206, and 208 as shown in the flow chart of FIG. 3. Step 202 can comprise concentrating the milk (e.g., 101 or 101T) to an intermediate concentration using at least one pre-evaporator (e.g., 110). Step 204 can comprise accumulating and cooling a holdup volume of intermediate concentration milk (e.g., 102) in at least one buffer (e.g., 121 or 122). Step 206 can comprise concentrating the intermediate concentration milk (e.g., 102) to a final concentration milk (e.g., 103) using at least one finisher evaporator (e.g., 131 or 132). As shown in FIG. 3, method 200 can further comprise step 208, which can comprise feeding the final concentration milk (e.g., 103) through at least one dryer feed system (e.g., 141 or 142) to a spray dryer (e.g., 150).

Method 200 as described herein can be performed where the at least one buffer tank comprises first buffer tank 121 and second buffer tank 122 and the at least one finish evaporator comprises first finisher evaporator 131 and second finisher evaporator 132. Method 200 can further comprise feeding intermediate concentration milk 102 from pre-evaporator system 110 to either first buffer tank 121 or second buffer tank 122 and intermediate concentration milk 102 from first buffer tank 121 or second buffer tank 122 can be supplied to either first finisher evaporator 131 or second finisher evaporator 132. Method 200 at step 204 can comprise cooling intermediate concentration milk 102 to for example, a range of about 40° F. to about 50° F., about 42° F. to about 48° F., about 44° F. to about 46° F. or be a temperature of about 45° F. Method 200 can further comprise agitating intermediate concentration milk 102 in at least one buffer tank (e.g., 121 or 122). In some embodiments, agitating of the intermediate concentration milk 102 may be done via an impeller or a recirculation loop configured to mix the buffer tank.

According to an exemplary embodiment, method 200 can further comprise shutting down pre-evaporator system 110, heat treatment system 160, and any additional ancillary equipment (e.g., pre-heaters and pasteurizer) for cleaning (CIP) while at least one finisher evaporator (e.g., 131 or 132) continues operating and drawing down the holdup volume in at least one buffer tank (e.g., 121 or 122). By accumulating a holdup volume in at least one buffer tank, one finisher evaporator can continue to operate producing final concentration milk 103 while pre-evaporator system 110 and heat treatment system 160 may be undergoing a CIP cleaning. Therefore, method 200 can further comprise operating spray dryer 150 continuously for longer than 20 hours.

Method 200 can further comprise cleaning pre-evaporator system 110 and heat treatment system 160 (i.e., when utilized), at least once every 10 hours, first buffer tank 121 and second buffer tank 122 at least once every 12 hours, and first finisher evaporator 131 and second finisher evaporator 132 at least once every 12 hours. As described herein, cleaning pre-evaporator system 110, heat treatment system 160, buffer tanks 121/122, and finisher evaporators 131/132 at least once every 12 hours can prevent or limit the likelihood of explosive grown of the thermophile and spores because the biofilm is removed before the detachment period ever takes off. Therefore, the thermophile and spore count in the milk powder can be low while still operating spray dryer 150 continuously.

The concentration of thermophile and spore in milk or milk powder may be quantified in colony forming units. For milk it may be quantified as colony forming units per milliliter (cfu/ml) and for milk powder it may be quantified as colony forming units per gram (cfu/g). According to an exemplary embodiment, system 100 may be configured to produce final concentration milk 103 having less than or equal to about 50 colony forming units per milliliter (cfu/ml) when the milk feed stream (i.e., 101 or 101T) has a count of less than equal to about 5 cfu/ml. A cfu count of the milk powder may correspond to or be dependent on a cfu count of final concentration milk 103. For example, final concentration milk 103 having a count of about 50 cfu/ml or less may result in system 100 producing milk powder having a count of about 100 cfu/ml or greater as a result of the 2× concentration from about 50% TS to about 96.5% TS.

It is noted, the thermophile and spore count in final concentration milk 103 may be dependent on the quality of the incoming milk feed. For example, system 100 may be configured to produce final concentration milk 103 having a cfu count, which is about 10 times (i.e., 10X) a cfu count of the incoming milk feed. In some embodiments, final concentration milk 103 may be less than, for example, about 100 cfu/ml, about 150 cfu/ml, about 200 cfu/ml, or about 300 cfu/ml. There are varieties of ways to test and determine a cfu counter, for example, the Thermophilic Spore Test NEN 6809 or Standard Methods of the Examination of Dairy Product (SMEDP 8.090).

Continuous operation of spray dryer 150 can comprise, for example, operating continuously for at least about 2 days, about 3 days, about 4 days, about 5 days, about 6 days, about 7 days, about 2 weeks, about 3 weeks, about 4 weeks, about 1 month to about 2 months, about 2 months to about 3 months, or more.

Method 200 as described herein can be performed such that first finisher evaporator 131 or second finisher evaporator 132 continuously produce final concentration milk 103 and supply it to at least one dryer feed system (e.g., 141 or 142). Method 200 can further comprise taking offline and cleaning the at least one dryer feed system periodically, for example, at least once every 12 hours, 24 hours, 30 hours, 36 hours, 42 hours, or more.

As discussed herein, it is not desired to make a significant capital investment in a piece of equipment (e.g., a second primary evaporator) that will sit idle in standby for significant periods of the time. However, in the case of system 100, pre-evaporator system 110 can be the primary evaporator, constituting the largest capital investment of any of the evaporator components, and as described above, pre-evaporator system 110 can be operating 20 out of every 24 hours in a day. While the first finisher evaporator 131 and second finisher evaporator 132 can be secondary evaporators that constitute a significantly smaller investment so having one sit idle in standby about half the time is more readily justified and economically practical given that it can enable continuous operation of spray dryer 150, another component that constitutes a significant capital investment. In other words, system 100, according to an exemplary embodiment can utilize dual systems (e.g., buffer tanks 121/122, finisher evaporators 131/132, and dryer feed systems 141/142) for those components comprising the smallest capital investment while maximizing operation of the components comprising the largest capital investment.

Figure 4:
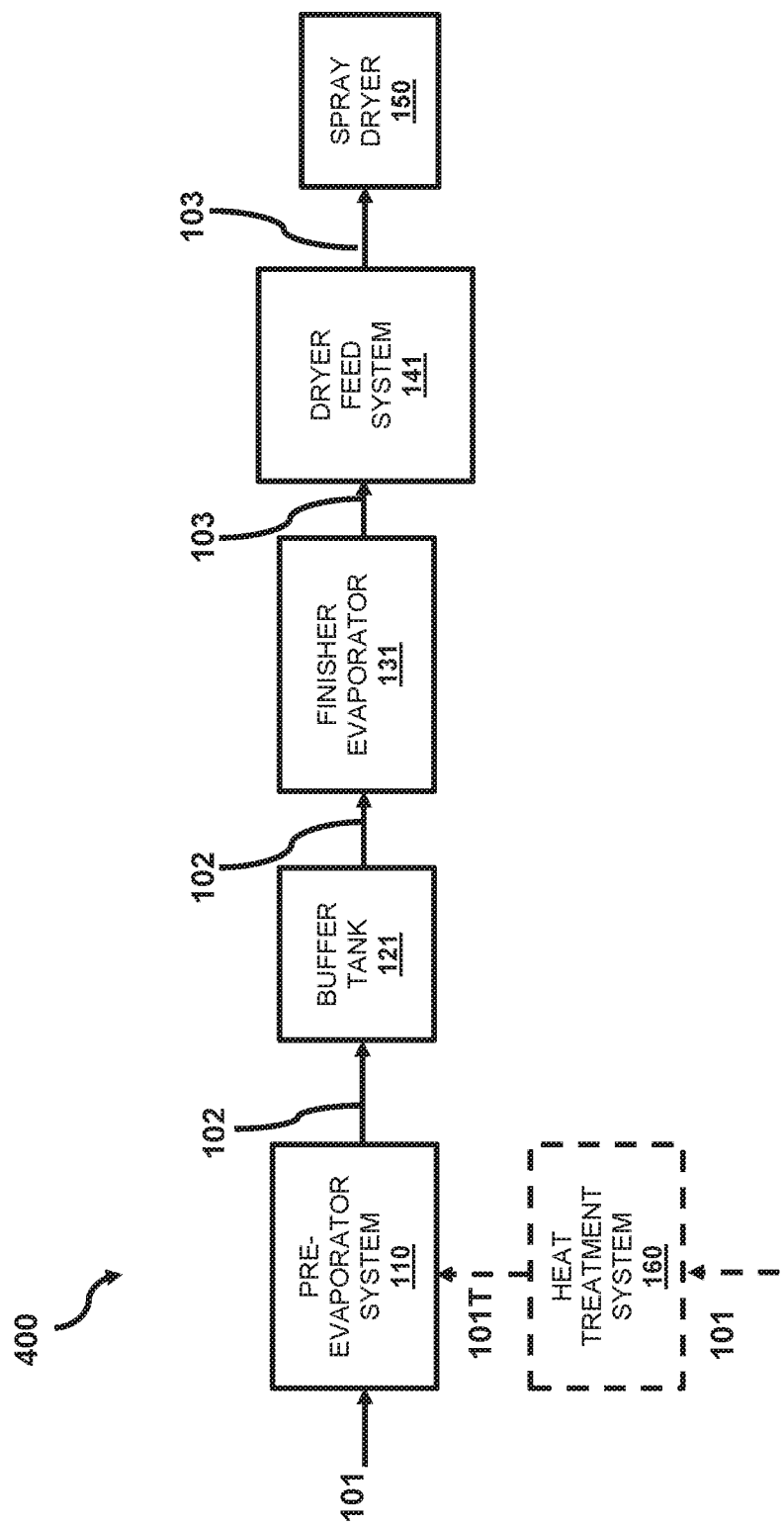
FIG. 4 is a flow schematic of an evaporator system, according to an exemplary embodiment.

In another embodiment, system 100 may be configured such that the dual system components (e.g., second buffer tank 122, second finisher evaporator 132, and second dryer feed system 142) may not be utilized and instead just one of each system component may be operated. Eliminating the dual aspect of system 100 can further reduce the capital cost. FIG. 4 shows a flow diagram of a system 400, which may represent system 100 without the dual system components. System 400 may comprise a pre-evaporator system 110, a first buffer tank 121, a first finisher evaporator 131, a first dryer feed system 141, and a spray dryer 150. The function of each component may be the same as described herein with regard to system 100.

For system 400 as for system 100, pre-evaporator system 110 can be sized such that its production discharge capacity of intermediate concentration milk 102 is greater than the production capacity of first finisher evaporator 131. As a result, during operation when pre-evaporator system 110 is processing milk stream 101 or heat treated milk stream 101T and discharging intermediate concentration milk 102, the volume of intermediate concentration milk 102 in first buffer tank 121 can increase. This situation may arise because first finisher evaporator 131 will draw less intermediate concentration milk 102 from the online buffer tank than is being fed to the online buffer tank from pre-evaporator system 110. Thus, during operation the surplus of intermediate concentration milk 102 supplied to the first buffer tank 121 can be collected to create a holdup volume.

According to an exemplary embodiment, the production discharge capacity of pre-evaporator system 110 can be, for example, about 120% of the production feed capacity of first finisher evaporator 131. Therefore, after about 5 hours the holdup volume in first buffer tank 121 can be substantially equal to 1 hour of production capacity of first finisher evaporator 131 or after about 10 hours the holdup volume in the online buffer tank can be substantially equal to 2 hours of production capacity of first finisher evaporator 131.

System 400 may be operated such that pre-evaporator system 110 may start prior to the start of first finisher evaporator 131 so that intermediate concentration milk 102 begins accumulating the holdup volume in first buffer tank 121. Accumulation of a holdup volume may continue until the holdup volume reaches the capacity of first buffer tank 121 at which time first finisher evaporator 131 may be started along with first dryer feed system 141 and sprayer dryer 150. In this scenario the rate of production of pre-evaporator system 110 may be controlled such that it is equal to or less than the production capacity of first finisher evaporator 131, otherwise the holdup volume would continue to rise and exceed the capacity of first buffer tank 121.

Another option may be to start first finisher evaporator 131, first dryer feed system 141, and spray dryer 150 prior to reaching capacity in first buffer tank 121. For example, pre-evaporator system 110 may be started 2 hours prior to the other components. After the first 2 hours, first finisher evaporator 131 along with first dryer feed system 141 and spray dryer 150 may be started. All the systems may operate together for 8 hours and if pre-evaporator system 110 is operating at, for example, 120% of the capacity of first finisher evaporator 131, and the holdup volume of first buffer tank 121 has been properly sized, then the holdup volume in first buffer tank 121 will be equal to four hours of production time for first finisher evaporator 131 based on the last 8 hours of operation in addition to the surplus built up in the first 2 hours of operation.

By utilizing the 4 hours of holdup volume, pre-evaporator system 110 may be shut down and CIP cleaned. Cleaning maybe completed in 2 hours or up to 4 hours may be utilized. Following cleaning, pre-evaporator system 110 may be restarted and all the components of system 400 may continue operating for an additional 10 to 12 hours at which time pre-evaporator system 110 may be shut down and CIP cleaned. First finisher evaporator 131 may continue running for several more hours (e.g., 2 to 4 hours) by drawing down the holdup volume in first buffer tank 121. Utilizing this sequence of operations spray dryer 150 can run continuously for about 24 hours while the pre-evaporator system may be cleaned at least once every 10 hours. The first buffer tank 121, the first finisher evaporator 131, and the first dryer feed system 141 will run in conjunction with the spray dryer 150, continuously for about 24 hours. In some embodiments, first buffer tank 121, first finisher evaporator 131, and first dryer feed system 141 may run up to 36 hours or more, for example, up to the U.S. Pasteurized Milk Ordinance (PMO) limit. Due to the location of these systems (i.e., being downstream of pre-evaporator system 110) and the environmental conditions, the biofilm grown is likely to be much less than that demonstrated in the upstream pre-evaporator system 110 and therefore these components may undergo a CIP cleaning just once about every 24 hours or more (e.g., up to the PMO limit).

Other sequences of operations for system 400 are possible. For example, pre-evaporator system 110 may be started along with first finisher evaporator 131, first dryer feed system 141, and spray dryer 150 and a holdup volume may be accumulated during the course of operation. Subsequently, pre-evaporator system 110 may be shut down and CIP cleaned for 2 hours after 10 to 12 hours of operation. Following the cleaning pre-evaporator system 110 may be restarted and operated for another 10 to 12 hours after which the holdup volume may be drawn down for additional few hours (e.g., 2 hours) bring the total operational time of spray dryer 150 to 24 hours or more (e.g., up to the PMO limit).

System 400 may be configured such that spray dryer 150 may operate continuously for at least 24 hours while pre-evaporator system 110 may be cleaned every 10 hours. System 400 may be advantageous because only one pre-evaporator system is utilized where in a system that swaps from one evaporator to another after 10-12 hours of operation, two full size evaporators are required, which constitute significant capital investments. Two full size evaporators may be particularly undesired because one of them may be idle for 50% of the time less the time for its CIP cleaning.

It is contemplated that system 100, system 400, and or similar embodiments may be assembled with all new equipment or in some embodiments, the systems may be assembled utilizing one or more pieces of new and one or more pieces of existing equipment. For example, in some embodiments existing equipment or systems may be retrofitted and reconnected in an arrangement as described herein to operate in accordance with the methods as described herein.

FIG. 5 includes a chart 500 that illustrates examples of the operating capability of system 100 and method 200, according to an exemplary embodiment. Chart 500 lists the major system components of system 100 down the left column, which can include heat treatment system 160, pre-evaporator system 110, first buffer tank 121, second buffer tank 122, first finisher evaporator 131, second finisher evaporator 132, first dryer feed system 141, second dryer feed system 142, and spray dryer 150. The columns extending to the right of the system component column indicate the status of each component of system 100 over the course of two continuous days of system 100 operation. Chart 500 assumes that at the start of the two days (i.e., 0 hour) all the system components are clean. "On" indicates that component is online and operating with product, "Off" indicates that system is offline and is clean, and "CIP" indicates that component is offline and cleaning. In the interest of simplicity, chart 500 does not account for transition periods where system components will be ramping up and ramping down to come online and offline. For example, in actual operation during transition periods both buffer tanks, both finisher evaporators, and both dryer feed systems may be online simultaneously for a short period as required to perform a seamless transition in which production can continue uninterrupted.

As shown in Chart 500, for the first ten hours (i.e., 0 to 10) pre-evaporator system 110, heat treatment system 160, first buffer tank 121, first finisher evaporator 131, first dryer feed system 141, and spray dryer 150 can all be on. In other embodiments, second buffer tank 122 could be on in place of first buffer tank 121, second finisher evaporator 132 could be online in place of first finisher evaporator 131, and second dryer feed system could be online in place of first dryer feed system 141. After ten hours, heat treatment system 160 and pre-evaporator system 110 can be taken offline for cleaning (CIP) while the remaining system components are unaffected. After two additional hours, and the completion of CIP for heat treatment system 160 and pre-evaporator system 110, both systems can be brought back on and processing can switch to the other buffer tank and finisher evaporator that had been off. By switching the buffer tank and the finisher evaporator the previously online buffer tank and finisher can be cleaned (CIP). Once cleaned these systems can be left off until the next switch between the buffer tanks and the finisher evaporators.

Chart 500 illustrates just one possible sequence of operations for a 48 hour product cycle utilizing system 100 and method 200. According to an exemplary embodiment, the operation capability of system 100 and method 200 can be varied in numerous ways. For example, the period in between CIP for the heat treatment system 160, pre-evaporator system 110, buffer tanks 121/122, finisher evaporators 131/132, and dryer feed systems 141/142 can be increased or decreased. For example, the period in between CIP for the heat treatment system 160 and pre-evaporator system 110 can be reduced to about 9 hours, 8 hours, 7 hours, 6 hours, 5 hours or increased to 11 hours, 12 hours, 13 hours, 14 hours, or 15 hours. Similarly, the period in between CIP for buffer tanks 121/122, and finisher evaporators 131/132 can be, for example, reduced to about 11 hours, 10 hours, 9 hours, 8 hours, 7 hours or increased to about 13 hours, 14 hours, 15 hours, 16 hours, 17 hours, or more up to the PMO limit. The period in between CIP for dryer feed systems 141/142 can be, for example, reduced to about 20 hours, 18 hours, 16 hours, 14 hours, 12 hours, or increased to about 26 hours, 28 hours, 30 hours, 36 hours or the PMO limit.

In addition, the duration of CIP for the heat treatment system 160, pre-evaporator system 110, buffer tanks 121/122, finisher evaporators 131/132, and dryer feed systems 141/142 can be increased or decreased. For example, CIP could be increased to about 2.5 hours, about 3 hours, about 3.5 hours, about 4 hours or decreased to about 1.75 hours, about 1.5 hours, about 1.25 hours, or about 1.0 hour.

System 100 and method 200, according to an exemplary embodiment, can be tailored to a 24 hour shift schedule enabling shift symmetry, as illustrated in FIG. 5. Shift symmetry of production cycles can be advantageous for many reasons. For example, shift symmetry can enable the same operator to consistently perform the same tasks increasing the efficiency and quality of the work performed.

According to various embodiments, system 100 can further comprise a variety of different pumps, heat exchangers, and other interconnecting piping and components. For example, centrifugal pumps, rotary lobe pumps, metering pumps, vacuum pumps, diaphragm pumps, piston type pumps, and the like. The heat exchangers can comprise plate and frame, tube and shell, and the like. For example, a plurality of tube and shell liquid to liquid heat exchangers as described in co-assigned U.S. patent application Ser. No. 14/208,136 can be utilized by system 100.

In other embodiments, system 100 can further comprise a product recovery system and a cleaning (CIP) system or system configured to clean the different components of system 100, as described herein. System 100 can further comprise a CIP reclaim system configured to reclaim a portion of the chemical and water used from a CIP cycle for later use.

System 100, according to various embodiments, can comprise a plurality of instruments (e.g., temperature transmitters, pressure transmitters, mass flow meters, volumetric flow meters, and the like) and a plurality of leak proof valves (e.g., ball valves, butterfly valves, control valves, pressure relief valves, and the like). The plurality of instruments and valves can be used to control the flow rate, temperature, concentration, holdup volume, location of the milk and other liquids and gases within system 100 as well as the liquids and gases entering and exiting system 100.

System 100 can further comprise a control system configured to interface with the plurality of instruments, plurality of valves, plurality of pumps and motors to operate system 100. The control system can include a computer, programmable logic controller (PLC), or the like that can be programmed to control system 100 manually, automatically, or a combination of both. The control system for system 100 can be configured to integrate with other production systems upstream of system 100 and downstream of system 100.

Although, system 100 and method 200 were described herein in relation to milk powder production, the present disclosure is not limited thereto. Instead, it is contemplated that the embodiments described herein can be implemented in a variety of other dairy processing operations including the spray drying of other dairy products, and in a variety of other non-diary product applications where concentration by evaporation or evaporation and then spray drying to a powder is utilized and where spore and bacteria growth may be a concern.

Other embodiments of the present disclosure will be apparent to those skilled in the art from consideration of the specification and practice of the present disclosure disclosed herein. It is intended that the specification and examples be considered as exemplary only, with a true scope and spirit of the present disclosure being indicated by the following claims.

What is claimed is:

1. A method of processing a milk stream comprising:
supplying a milk stream to a pre-evaporator;
concentrating the milk stream using the pre-evaporator, thereby producing an intermediate concentration milk, and directing the intermediate concentration milk to a buffer tank;
cooling and accumulating a holdup volume of the intermediate concentration milk in the buffer tank, wherein the intermediate concentration milk is cooled to between about 35° F. to about 50° F., thereby producing a cooled intermediate concentration milk;
drawing and reheating the cooled intermediate concentration milk from the buffer tank, thereby producing a reheated intermediate concentration milk; and
concentrating the reheated intermediate concentration milk using a finisher evaporator, thereby producing a final concentration milk;
wherein the holdup volume of the intermediate concentration milk is accumulated by the pre-evaporator producing the intermediate concentration milk at a rate greater than a rate at which the finisher evaporator draws the cooled intermediate concentration milk from the buffer tank.

2. The method of claim 1, further comprising feeding the final concentration milk to a dryer feed system and a spray dryer, which produce a milk powder.

3. The method of claim 1, further comprising stopping the supply of the milk stream to the pre-evaporator, cleaning the pre-evaporator while the finisher evaporator continues operating and while the holdup volume of the intermediate concentration milk accumulated in the buffer tank is drawn down.

4. The method of claim 1, wherein the final concentration milk has a colony forming units (cfu) value of about 50 cfu per milliliter (cfu/ml) or less when the milk stream supplied to the pre-evaporator has a cfu value of about 5 cfu/ml or less.

5. The method of claim 1, wherein the milk stream supplied to the pre-evaporator is a whole milk or a standardized whole milk having a total solids (TS) concentration between about 12% TS to about 14% TS, the intermediate concentration milk produced by the pre-evaporator has a TS concentration between about 30% TS to about 42% TS, and the final concentration milk produced by the finisher evaporator has a TS concentration between about 40% TS to about 65% TS.

6. The method of claim 1, wherein the milk stream supplied to the pre-evaporator is a skim milk or a standardized skim milk having a total solids (TS) concentration between about 8% TS to about 10% TS, the intermediate concentration milk produced by the pre-evaporator has a TS concentration between about 30% TS to about 42% TS, and the final concentration milk produced by the finisher evaporator has a TS concentration between about 40% TS to about 65% TS.

7. The method of claim 1, further comprising agitating the intermediate concentration milk in the buffer tank.

8. The method of claim 1, further comprising heat treating the milk stream supplied to the pre-evaporator using a heat treatment system, wherein the heat treatment system is configured to heat the milk stream up to a temperature of about 250° F.

9. The method of claim 1, further comprising reheating the cooled intermediate concentration milk drawn from the buffer tank using recovered heat.

10. The method of claim 9, further comprising reheating the cooled intermediate concentration milk drawn from the buffer tank using heat recovered from the cooling of the intermediate concentration milk accumulated in the buffer tank.

11. The method of claim 1, wherein a pre-evaporator production discharge capacity for the intermediate concentration milk is between about 105% to about 135% of finisher evaporator production feed capacity for the reheated intermediate concentration milk.

12. A method of processing a milk stream comprising:
supplying a milk stream to a pre-evaporator;
concentrating the milk stream using the pre-evaporator, thereby producing an intermediate concentration milk, and directing the intermediate concentration milk to at least one of a first buffer tank and a second buffer tank;
cooling and accumulating a holdup volume of the intermediate concentration milk in at least one of the first buffer tank and the second buffer tank, wherein the intermediate concentration milk is cooled to between about 35° F. to about 50° F., thereby producing a cooled intermediate concentration milk;
drawing and reheating the cooled intermediate concentration milk from at least one of the first buffer tank and the second buffer tank, thereby producing a reheated intermediate concentration milk; and
concentrating the reheated intermediate concentration milk using at least one of a first finisher evaporator and a second finisher evaporator, thereby producing a final concentration milk;
wherein the holdup volume of the intermediate concentration milk is accumulated by the pre-evaporator producing the intermediate concentration milk at a rate greater than a rate at which the first finisher evaporator or the second finisher evaporator draws the cooled intermediate concentration milk from at least one of the first buffer tank and the second buffer tank.

13. The method of claim 12, further comprising feeding the final concentration milk to at least one of a first dryer feed system and a second dryer feed system configured to supply the final concentration milk to a spray dryer configured to produce a milk powder.

14. The method of claim 12, further comprising stopping the supply of the milk stream to the pre-evaporator cleaning the pre-evaporator after about 10 hours of operation while the first finisher evaporator or the second finisher evaporator continues operating and while the holdup volume of the cooled intermediate concentration milk accumulated in the first buffer tank or the second buffer tank is drawn down.

15. The method of claim 14, further comprising:
drawing down the holdup volume accumulated in the first buffer tank and concentrating the reheated intermediate concentration milk using the first finisher evaporator while the supply of the milk stream to the pre-evaporator is stopped,
restarting the supply of the milk stream to the pre-evaporator, cooling and accumulating the holdup volume in the second buffer tank and concentrating the reheated intermediate concentration milk using the second finisher evaporator after restarting the supply of the milk stream to the pre-evaporator.

16. The method of claim 15, further comprising cleaning the second buffer tank and the second finisher evaporator while the supply of the milk stream to the pre-evaporator is stopped.

17. The method of claim 12, further comprising reheating the cooled intermediate concentration milk drawn from at least one of the first buffer tank and the second buffer tank using recovered heat.

18. The method of claim 12, further comprising reheating the cooled intermediate concentration milk drawn from at least one of the first buffer tank and the second buffer tank using heat recovered from the cooling of the intermediate concentration milk accumulated in at least one of the first buffer tank and the second buffer tank.

19. The method of claim 12, wherein a pre-evaporator production discharge capacity for the intermediate concentration milk is between about 105% to about 135% of a first finisher evaporator or second finisher evaporator production feed capacity for the reheated intermediate concentration milk.

20. A method of processing a milk stream comprising:
supplying a milk stream to a pre-evaporator;
concentrating the milk stream using the pre-evaporator, thereby producing an intermediate concentration milk, and directing the intermediate concentration milk to a buffer tank;
cooling and accumulating a holdup volume of the intermediate concentration milk in the buffer tank, wherein the intermediate concentration milk is cooled, thereby producing a cooled intermediate concentration milk;
drawing and reheating the cooled intermediate concentration milk from the buffer tank using recovered heat, thereby producing a reheated intermediate concentration milk; and
concentrating the reheated intermediate concentration milk using a finisher evaporator, thereby producing a final concentration milk;
wherein the holdup volume of the intermediate concentration milk is accumulated by the pre-evaporator producing the intermediate concentration milk at a rate greater than a rate at which the finisher evaporator draws the cooled intermediate concentration milk from the buffer tank.

* * * * *

UNITED STATES PATENT AND TRADEMARK OFFICE
CERTIFICATE OF CORRECTION

Page 1 of 1

PATENT NO. : 10,687,540 B2
APPLICATION NO. : 16/212778
DATED : June 23, 2020
INVENTOR(S) : Artur G. Zimmer It is certified that error appears in the above-identified patent and that said Letters Patent is hereby corrected as shown below:

In the Claims

Claim 11, Column 18, Lines 18-19:
"105% to about 135% of finisher evaporator production feed capacity"
Should read:
--105% to about 135% of a finisher evaporator production feed capacity--.

Claim 14, Column 18, Line 54:
"the supply of the milk stream to the pre-evaporator cleaning"
Should read:
--the supply of the milk stream to the pre-evaporator, cleaning--.

Signed and Sealed this
Fourth Day of August, 2020

Andrei Iancu
*Director of the United States Patent and Trademark Office*